United States Patent [19]

Schotten

[11] 4,129,993
[45] Dec. 19, 1978

[54] REFRIGERATION EQUIPMENT, PARTICULARLY HOUSEHOLD REFRIGERATION OR THE LIKE

[75] Inventor: Henno Schotten, Giengen, Germany

[73] Assignee: Bosch-Siemens Hausgeräte GmbH, Stuttgart, Germany

[21] Appl. No.: 782,403

[22] Filed: Mar. 29, 1977

[30] Foreign Application Priority Data

Apr. 13, 1976 [DE] Fed. Rep. of Germany ....... 2616175

[51] Int. Cl.$^2$ ............................................ F25D 21/00
[52] U.S. Cl. ...................................... 62/156; 62/140; 307/203
[58] Field of Search ................... 62/140, 80, 156, 154, 62/276; 307/203

[56] References Cited

U.S. PATENT DOCUMENTS

| 3,222,882 | 12/1965 | Sutton, Jr. et al. ................ 62/156 X |
| 3,963,947 | 6/1976 | Bogel .................................... 307/203 |
| 4,039,855 | 8/1977 | Callan et al. ......................... 307/203 |

OTHER PUBLICATIONS

Transistor Manual; 1964, G.E., pp. 199, 200.

*Primary Examiner*—William E. Wayner
*Attorney, Agent, or Firm*—Herbert L. Lerner

[57] ABSTRACT

Refrigeration equipment, particularly a household refrigerator or the like, having a heat-insulated refrigeration chamber and a refrigeration unit which can be switched-on intermittently by a temperature-dependent control and the heat exchanger of which, arranged in the refrigeration chamber, can be defrosted between the cooling periods through the supply of thermal energy and/or natural incidence of heat from the environment of the refrigeration equipment, the control being equipped with two sensors, one of which measures the air temperature in the refrigeration chamber and the other, the temperature at the heat exchanger. The sensors have their switching functions coupled by a mutually interlocking electronic circuit in which the switching function activated by the temperature at one sensor must run down completely before the switching function activated at the other sensor is set in motion. Proper defrosting of the heat exchanger is ensured and the temperature in the refrigeration chamber is kept constant independent to a large extent of the ambient temperature.

3 Claims, 3 Drawing Figures

REFRIGERATION EQUIPMENT, PARTICULARLY HOUSEHOLD REFRIGERATION OR THE LIKE

BACKGROUND OF THE INVENTION

1. Field of the Invention

This invention relates to refrigeration equipment and more particularly refers to a household refrigerator having a temperature-dependent control for switching-on a refrigeration unit and for defrosting the heat exchanger in the refrigeration chamber.

2. Description of the Prior Art

It is generally customary in refrigeration equipment to equip the regulator for controlling the cooling periods with only a single sensor. The latter measures either the temperature of the evaporator serving as a heat exchanger on the cold side, or the air temperature in the refrigeration chamber. Although the control of the refrigeration unit according to the evaporator temperature does permit proper defrosting of the evaporator, the consequence is an undesired dependence of the temperature in the refrigeration chamber on the room temperature prevailing at the point of installation of the refrigeration equipment. A temperature control which depends only on the air temperature in the refrigeration chamber has the disadvantage that proper defrosting of the evaporator is not ensured; for, in refrigeration equipment controlled only according to the air temperature in the refrigeration chamber, the danger exists that the refrigeration unit is switched-on again before the evaporator is completely defrosted. In this manner, the functioning of the refrigeration equipment which is controlled according to the air temperature is degraded by a gradually increasing deposit of frost and ice.

It has also been proposed to equip the control with two sensors, one of which monitors the air temperature in the refrigeration chamber and the other, the temperature of the evaporator and therefore ensures a complete defrosting of the latter. Thus, a control has become known, designed for example, as a bimetallic switch, which performs the function of the sensor for the air temperature and which is equipped with a heating resistor serving as the thermal restoring device for the bimetallic element. A second sensor which is likewise designed as a bimetallic switch is also arranged in the circuit of the control. This second sensor rests against the evaporator or heat exchanger of the refrigeration equipment and is adjusted so that its contacts are closed as soon as the evaporator is properly defrosted by a corresponding temperature rise due to natural incidence of heat or supplement heating. The heating resistor by the second heat sensor serving as the thermal restoring device for the bimetallic element of the control is therefore switched only when the evaporator is completely defrosted. A rise of the air temperature in the refrigeration equipment is simulated at the thermal bimetal of the control which constitutes the first heat sensor by the thereupon commencing heating-up of the heating resistor. This causes the control to switch, whereby the refrigeration unit starts up for a new cooling period.

It turned out, however, that the temperature control proper in this known arrangement exhibits a relatively large inertia because of the relatively high switch-on point due to manufacturing reasons and the easier adjustability, and therefore works merely as a time switch. Furthermore, the heating resistor of the thermal restoring device, which serves for compensating the high switch-on point, must first heat the thermal bimetal of the control, after defrosting, relatively strongly up to its switch-on value. In this manner, so much time is lost that the temperature in the refrigeration chamber can rise far beyond the set value.

It has been found to be another disadvantage of the known circuit that the thermal restoring required for compensating the relatively large switching interval of the bimetallic element is likewise greatly dependent on the ambient temperature prevailing at the point of installation of the refrigeration equipment, so that there also the switching range drifts if the ambient temperature changes.

The above described shortcomings have essentially had the result that refrigeration equipment provided with a control of this design never got beyond the experimental stage and never attained practical or economic importance.

SUMMARY OF THE INVENTION

An object of the present invention is to provide a refrigeration equipment having a reliable control mechanism which makes it possible to keep the temperature set at the control constant largely independent of the ambient temperature and to ensure proper defrosting of the evapoator. With the foregoing and other objects in view, there is provided in accordance with the invention refrigeration equipment, particularly household refrigeration or the like, with a heat-insulated refrigeration chamber having a heat exchanger for cooling, and a refrigeration unit which can be switched-on intermittently by a temperature-dependent control, and the heat exchanger of which, arranged in the refrigeration chamber, is defrosted between the cooling periods through the supply of heat by thermal energy and natural incidence of heat from the environment of the refrigeration equipment, the control being equipped with two sensors, one of which measures the air temperature in the refrigeration chamber and the other, the temperature at the heat exchanger, the improvement including coupling the switching functions of sensors by a mutually interlocking electronic circuit in which the switching function actuated by the temperature at one sensor must run down completely before the switching function actuated at the other sensor is set in motion.

Other features which are considered as characteristic for the invention are set forth in the appended claims.

Although the invention is illustrated and described herein as embodied in refrigeration equipment, particularly household refrigeration or the like, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

The switching functions of the sensors are coupled by a mutually interlocking electronic circuit in such a manner that the switching function released or activated by the temperature at one sensor must run down completely before the switching function released at the other sensor is set in motion.

Contrary to the known circuit with two bimetallic thermal elements, no time delay occurs after the defrosting process is completed until the refrigeration unit is switched on again. With the mutually exclusive coupling, in accordance with the invention, the switching functions are activated without time delay by the two sensors so that the evaporator is reliably defrosted and likewise, the temperature set at the control is accurately held, independently of the ambient temperature of the refrigeration equipment.

An advantageous further embodiment is obtained if diodes are used as sensors, which change their forward voltage as a function of the temperature. With a refrigeration equipment equipped in accordance with the invention it is possible to hold the temperature set at the control accurately within narrow limits and to ensure reliable defrosting of the evaporator.

Figure 1:
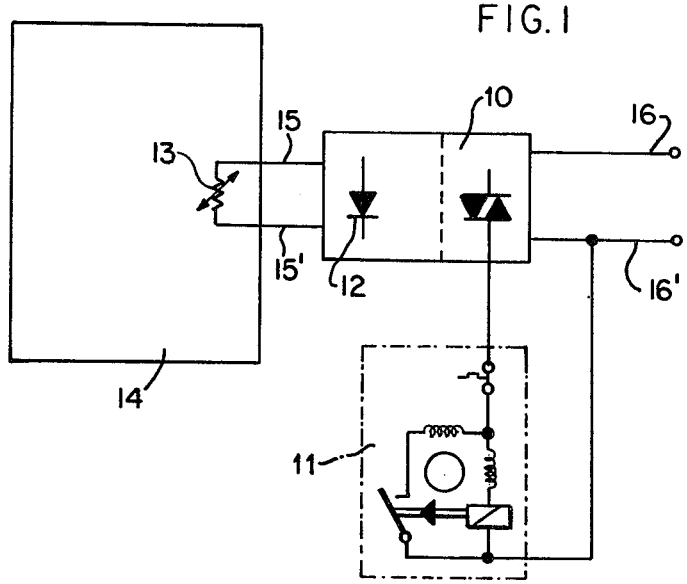
FIG. 1 shows a simplified circuit diagram of a control equipped with two sensors, for a refrigeration equipment, in conjunction with an electric motor driving its refrigeration unit, as well as with an evaporator of the refrigeration equipment.

A temperature control 10, shown simplified in FIG. 1 in block diagram form, is connected into the circuit of an electric motor 11, which in the usual manner drives intermittently a refrigeration unit of a refrigeration equipment, not shown. The electric motor 11, which is equipped with an overload switch, is designed as an asynchronous motor with a main and an auxiliary winding, the latter being switched by means of a started relay. The temperature control 10 which, in the example shown, is designed as a circuit integrated on a silicon crystal, comprises a temperature sensor 12 which has a diode integrated on the crystal and measures the air temperature in the refrigeration chamber of the refrigeration equipment. The forward voltage of the diode changes, for instance, by about 2 mV per degree K. Another temperature sensor 13, likewise designed as a diode, rests against an evaporator 14 of the refrigeration equipment in good heat-conducting contact with the evaporator. Sensor 13 is connected to the temperature control 10 via lines 15 and 15'. The described arrangement is connected via lines 16 and 16' to an alternating current source, for instance, the outlet of an electrical lighting system.

Figure 2:
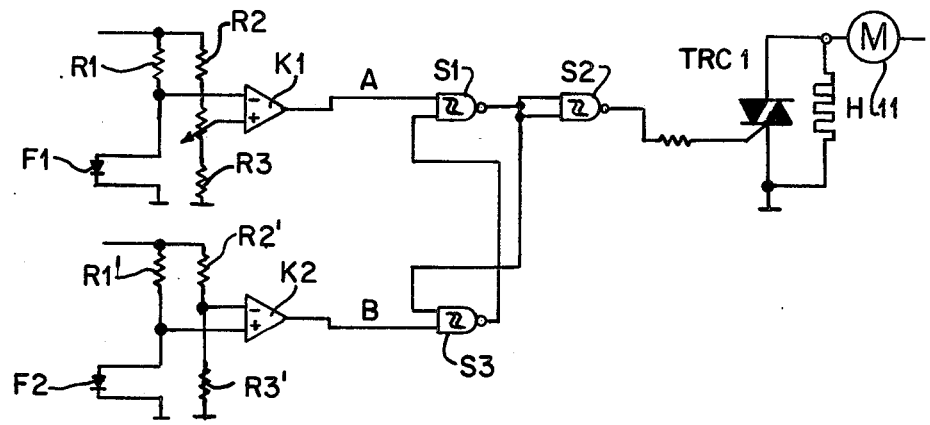
FIG. 2 is a circuit diagram of the control with an electronic circuit for coupling the switching functions released by the two sensors with the defrost heater in parallel to TRC 1.
Figure 3:
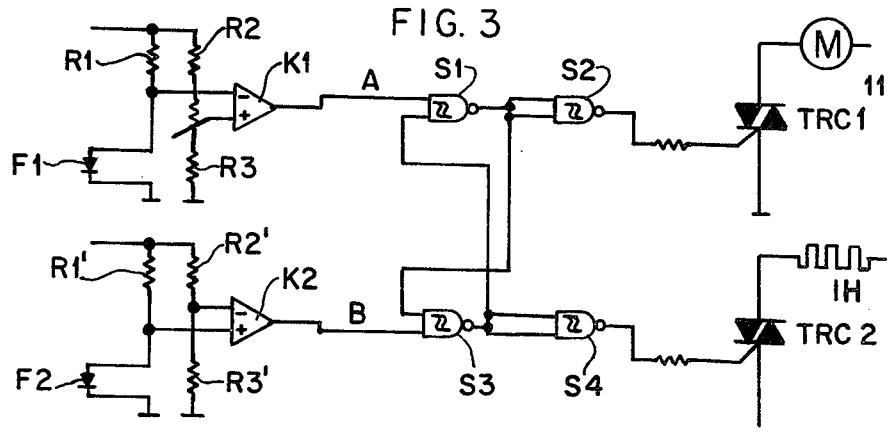
FIG. 3 is a circuit diagram of the control with an electronic circuit for coupling the switching functions released by the two sensors with the defrost heater in series with TRC 2.

In the circuit diagram of the temperature control 10 shown in FIG. 2 and FIG. 3, the temperature sensor 12 which measures the air temperature in the refrigeration chamber, is designated as F1, while the temperature sensor 13, which measures the temperature of the evaporator 14, carries the designation F2. As mentioned, both temperature sensors 12 and 13 are diodes, the forward voltage of which changes as a function of the ambient temperature and are connected into bridge circuits together with the resistors R1 to R3 and R1' to R3', respectively. Their forward voltages are compared with fixed voltages by comparators K1 and K2.

The signals A and B so generated are fed via Schmitt triggers, which bring about only stepwise switching of the connected electric motor 11 of the refrigeration unit and a defrosting heater H for the evaporator 14. These Schmitt triggers constitute at the same time a NAND gate, by means of which the signals A and B are mutually interlocked up to S1 and S3 in such a manner that cooling periods and defrosting periods must run down completely and cannot overlap.

The operation of the circuit according to FIG. 3 will be described in the following with the aid of an example:

Assuming that the air temperature in the refrigeration chamber is colder than the set value and the evaporator 14 is defrosted, i.e. warmer than +4° C, then both signals A and B are zero.

As a consequence, the outputs S1 and S3 are both at +U, so that the connection as a flip-flop is ineffective. The outputs S2 and S4 are both zero and thereby, the Triac (Trademark of General Electric Co. for a gate-controlled semiconductor switch) TRC 1 closing the circuit of the electric motor 11 as well as the Triac TRC 2 controlling the circuit of the defroster heater are cut off. If now the temperature in the refrigeration chamber rises above the set value, the signal A becomes +U and switches the electric motor 11 of the refrigeration unit on via S1, S2 and Triac TRC1. The output of S1 is also connected to an input of S3 and keeps the output of the latter at +U. This state is maintained also if the signal B changes somewhat later +U because the evaporator is cooling off. Only when a full cooling period is completed, i.e. when the air temperature in the refrigeration chamber has dropped again below the set value, can the signal B initiate the next defrosting period. Also this defrosting period must be executed completely, as now the output of S1 is held at +U via the second input of S3.

Thus, signal B which controls the defrosting operation, becomes +U when the temperature at the temperature-transducer F2 falls below the cut-off point for the defroster-heater, i.e. below 4° C. Since this is the case for every cooling period, defrosting occurs necessarily following every cooling period. However, the electronic interlocking prevents the defroster-heater turning on during the cooling period i.e. while the compressor is running. The end of the defrosting operation occurs the moment the temperature at the evaporator has risen again to 4° C, due to heat addition and consequently signal B again becomes 0.

In the circuit shown in FIG. 2, the Schmitt trigger S4 and the Triac TRC2 can be omitted without major disadvantage if the defroster heater H is connected parallel to TRC 1. Here the defroster heater H has electric potential when TRC 1 is blocked (open) while it is shunted when TRC 1 is conducting. Thus, the "on" state exists always unless cooling takes place. Otherwise, the circuit works as described above.

Instead of the diodes as temperature sensors, NTC (negative-temperature-coefficient) resistors may also be used. The mutual interlocking of the signals A and B described can also be realized by coupling the comparators K1 and K2 and vice versa. The Schmitt triggers can then be omitted. The basic logical function described is not changed thereby.

For the proposed application, the temperature control 10 and the drive for the Triac serving as a power switch can be realized as an integrated circuit on a silicon crystal. In this circuit, also a control signal for driving a further power switch for switching-on the auxiliary winding of the electric motor 11 can be integrated without difficulty. Thereby, the mechanical starter relay can be replaced without great cost. Such a circuit has the particularly advantageous effect that the electric motor 11 of the refrigeration unit is switched on, without additional cost, at the zero crossing of the voltage and can be switched-off at the zero crossing of the current.

There are claimed:

1. In refrigeration equipment, particularly household refrigerator or the like, with a heat-insulated refrigeration chamber having a heat exchanger for cooling, and a refrigeration unit which is switched-on intermittently by a temperature-dependent control, and the heat exchanger of which, arranged in the refrigeration chamber, is defrosted between the cooling periods through the supply of heat by thermal energy and natural incidence of heat from the environment of the refrigeration equipment, the control being equipped with two sensors with switching functions one sensor of which measures the air temperature in the refrigeration chamber and the other, the temperature at the heat exchanger, the improvement comprising coupling the switching functions of the sensors by a mutually interlocking electronic circuit in which the switching function actuated by the temperature at one sensor must run down completely before the switching function actuated at the other sensor is set in motion.

2. Refrigeration equipment according to claim 1, wherein diodes are used as sensors, which change their forward voltage as a function of the temperature.

3. Refrigeration equipment according to claim 2, wherein the diode for measuring the air temperature is a component integrated in the circuit for temperature control and arranged inside the refrigeration chamber.

* * * * *